(12) United States Patent
Wilsher

(10) Patent No.: US 8,279,499 B2
(45) Date of Patent: Oct. 2, 2012

(54) SINGLE LED DUAL LIGHT GUIDE

(75) Inventor: Michael John Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 290 days.

(21) Appl. No.: 12/776,977

(22) Filed: May 10, 2010

(65) Prior Publication Data

US 2011/0273751 A1    Nov. 10, 2011

(51) Int. Cl.
*H04N 1/04* (2006.01)

(52) U.S. Cl. ......... 358/474; 358/475; 358/497; 358/498

(58) Field of Classification Search ................... 358/474, 358/475, 497, 498
See application file for complete search history.

(56) References Cited

U.S. PATENT DOCUMENTS

| | | | |
|---|---|---|---|
| 3,562,539 A | 2/1971 | Beroza et al. | |
| 4,048,486 A * | 9/1977 | Kriege | 362/554 |
| 2006/0187500 A1 | 8/2006 | Sakurai | |
| 2007/0058359 A1 * | 3/2007 | Saitoh et al. | 362/97 |
| 2009/0052205 A1 | 2/2009 | Chen et al. | |
| 2009/0244510 A1 * | 10/2009 | Domanowski | 355/70 |

FOREIGN PATENT DOCUMENTS

| | | |
|---|---|---|
| JP | 2006227384 | 8/2006 |
| JP | 2007047534 | 2/2007 |
| WO | 2008129539 | 10/2008 |

OTHER PUBLICATIONS

Great Britain Application No. GB1107441.6; Search Report, Sep. 1, 2011.

* cited by examiner

*Primary Examiner* — Houshang Safaipour
(74) *Attorney, Agent, or Firm* — MH2 Technology Law Group LLP

(57) ABSTRACT

Various embodiments provide illuminators and related scanner illuminating systems, wherein the illuminators can include a light source having one or more LEDs coupled to a plurality of light guides through one or more light splitters such that light emitted from the light source can be split into each of the plurality of light guides.

19 Claims, 4 Drawing Sheets

SINGLE LED DUAL LIGHT GUIDE

FIELD OF THE USE

The present teachings relate generally to illuminators, and, more particularly, to scanner illuminators and related scanner illuminating systems having one light source coupled with a plurality of light guides.

BACKGROUND

In office equipment, such as digital copiers and facsimile machines, original hard-copy documents are recorded as digital data using what can be generally called a "scanner." In a typical scanner, a document sheet is illuminated and the light reflected from the document sheet is recorded by a photosensitive device such as a charge coupled device (CCD) array and converted to digital image data. A narrow strip of the document sheet is illuminated as the sheet is moved through a document handler, or the photosensitive device is moved relative to a platen on which the document sheet is placed.

Conventional scanner illuminators include a cold cathode lamp and an opposing mirror; a light emitting diode (LED) bar having multiple LEDs and an opposing mirror; or an LED coupled with a light guide and an opposing mirror. Some of the illumination comes direct from the lamp or LEDs and some is sent across to the mirror and then reflected to the document sheet. Typically about 70% of the illuminating light comes directly from the lamp or LEDs and about 30% of the illuminating light comes from the mirror, with a significant light loss.

Another type of conventional scanner illuminators includes two sets of LEDs. Each set has multiple LEDs. The two sets of LEDs are configured in opposition and combined with a focusing lens. As the illuminating light from the two sets of LEDs is directed at the document sheet, significant light loss can be generated.

In addition to significant light loss, it is a challenge for conventional scanner illuminators to have an even illumination along the narrow strip of the document sheet. Further, the angular distribution of light produced by the conventional scanner illuminators at the document can vary in a fast scan direction. Irregularities in illuminating level and the illuminated area can then occur and result in defects in the final image data.

Thus, there is a need to overcome this and other problems of the prior art and to provide an illuminator having one light source coupled with a plurality of light guides.

SUMMARY

According to various embodiments, the present teachings include a scanner illuminator. The scanner illuminator can include a light source; a plurality of light guides; and one or more light splitters coupled with the light source and the plurality of light guides. The light generated by the light source can then be introduced into each of the plurality of light guides through the one or more light splitters. Each light guide can divert the introduced light outside of the light guide.

According to various embodiments, the present teachings also include a scanner illuminating system. The scanner illuminating system can include a scanner illuminator having a single light emitting diode (LED) configured to emit light into a light splitter. Two or more light guides can be coupled with the light splitter such that the light emitted from the single LED is introduced into each of the two or more light guides through the light splitter. Each light guide can divert the introduced light outside of the light guide.

According to various embodiments, the present teachings further include another scanner illuminating system. The scanner illuminating system can include a scanner illuminator having one light source configured for emitting light. The one light source can include one or more light emitting diodes (LEDs). One or more light splitters can then be configured for splitting the emitted light from the one or more LEDs into a plurality of light guides. Each light guide can divert the split light outside of the light guide to illuminate a document. The scanner illuminating system can also include a lens that is adapted to receive an imaging light reflected from the illuminated document and to focus the reflected imaging light onto a sensor element. The sensor element can generate an electronic signal corresponding to the reflected imaging light.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Various embodiments provide illuminators and related scanner illuminating systems. The illuminators can include one light source coupled with a plurality of light guides by one or more light splitters such that light introduced from the one light source can be split and introduced into each of the plurality of light guides. The light introduced into each light guide can be diverted outside of the light guide, for example, to illuminate a hard-copy document for digital recording. In embodiments, the disclosed illuminator can be configured in a full width array (FWA) based scanner, a CCD based scanner, a contact image sensor (CIS) based scanner, and/or a complementary metal oxide semiconductor (CMOS) based scanner.

Figure 1:
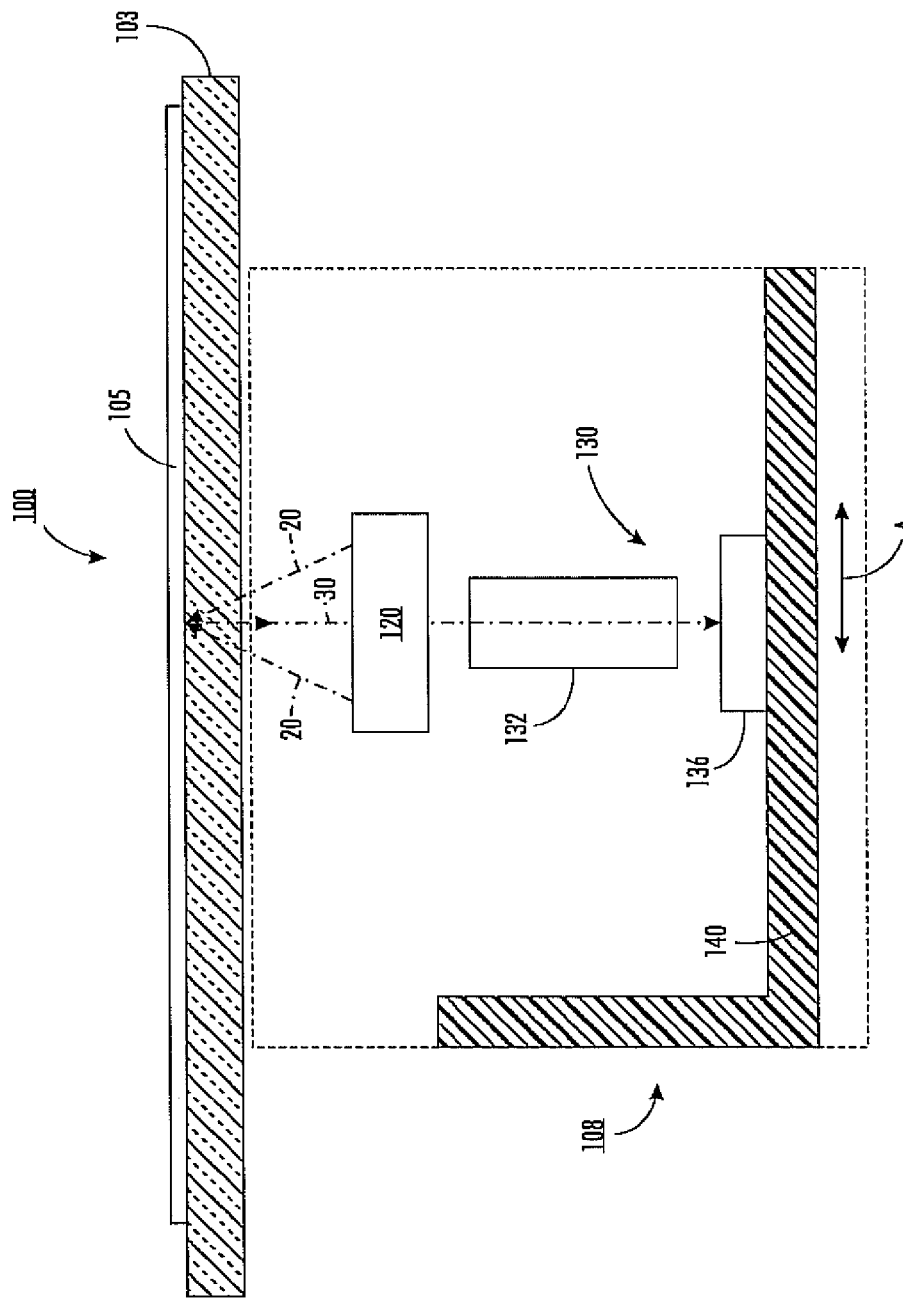
FIG. 1 depicts an exemplary scanner illuminating system in accordance with various embodiments of the present teachings.

FIG. 1 depicts an exemplary scanner illuminating system 100 in accordance with various embodiments of the present teachings. It should be readily apparent to one of ordinary skill in the art that the system 100 depicted in FIG. 1 represents a generalized schematic illustration and that other components/devices can be added or existing components/devices can be removed or modified.

As shown, the system 100 can include a platen 103 and a scan head 108. In embodiments, the platen 103 can have a distinct surface on which a document sheet 105 can be placed for recording there-from. Optionally, associated with the platen 103 can be a document handler (not shown), which sequentially feeds sheets from a multi-page original document.

The scan head 108 can be mounted on a moveable carriage 140 for recording light reflected from images on document sheets. In general, the carriage can translate in direction A, as shown in FIG. 1. The scan head 108 can be positioned to illuminate the document and can include an illuminator 120 and a detector 130. Light 20 from the illuminator 120, which will be described in detail below, can illuminate a thin strip of the document.

The detector 130 can include a lens arrangement 132 and a photosensitive device 136. The photosensitive device 136 can include one or more linear arrays of sensor elements, for example, photosensors, to record the reflected imaging light 30. The photosensors can include solid-state devices including, for example, CCD, FWA, CIS, or CMOS devices.

The lens arrangement 132, including a SELFOC® lens or other microlens arrangements, can be interposed between the platen 103 and the photosensitive device 136 for focusing the reflected imaging light 30 on the photosensor array.

The light reflected from the document can be converted by the photosensitive device 136 into electronic signals forming imaged data, which electronically represent the document. The imaged data can be stored on a recording device such as a memory storage device in a computer.

Note that although FIG. 1 uses a platen scanning configuration as an example, one of ordinary skill in the art would understand that the disclosed scanner illuminators and related illuminating systems can be used in other scanning configurations including, for example, a bank note scanner or a scanner having a document handler to simultaneously scan two sides of a document sheet in a single pass.

Figure 2A:
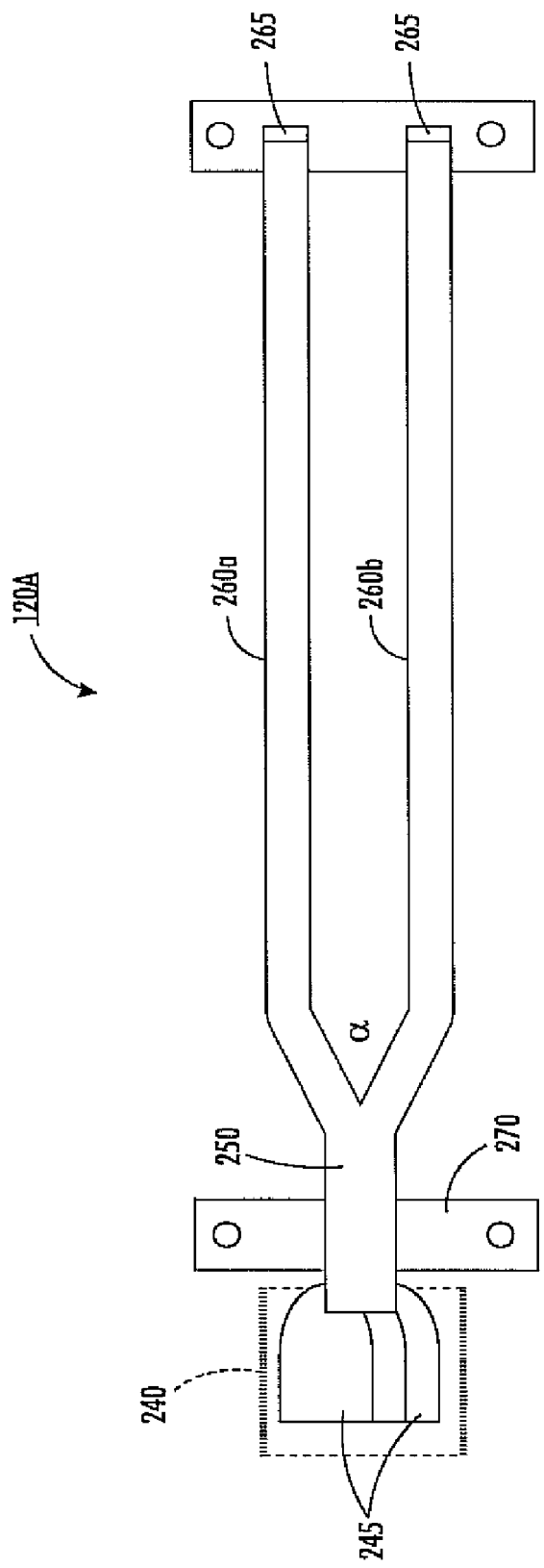
FIGS. 2A-2B depict various exemplary illuminators useful for the system of FIG. 1 in accordance with various embodiments of the present teachings.
Figure 2B:
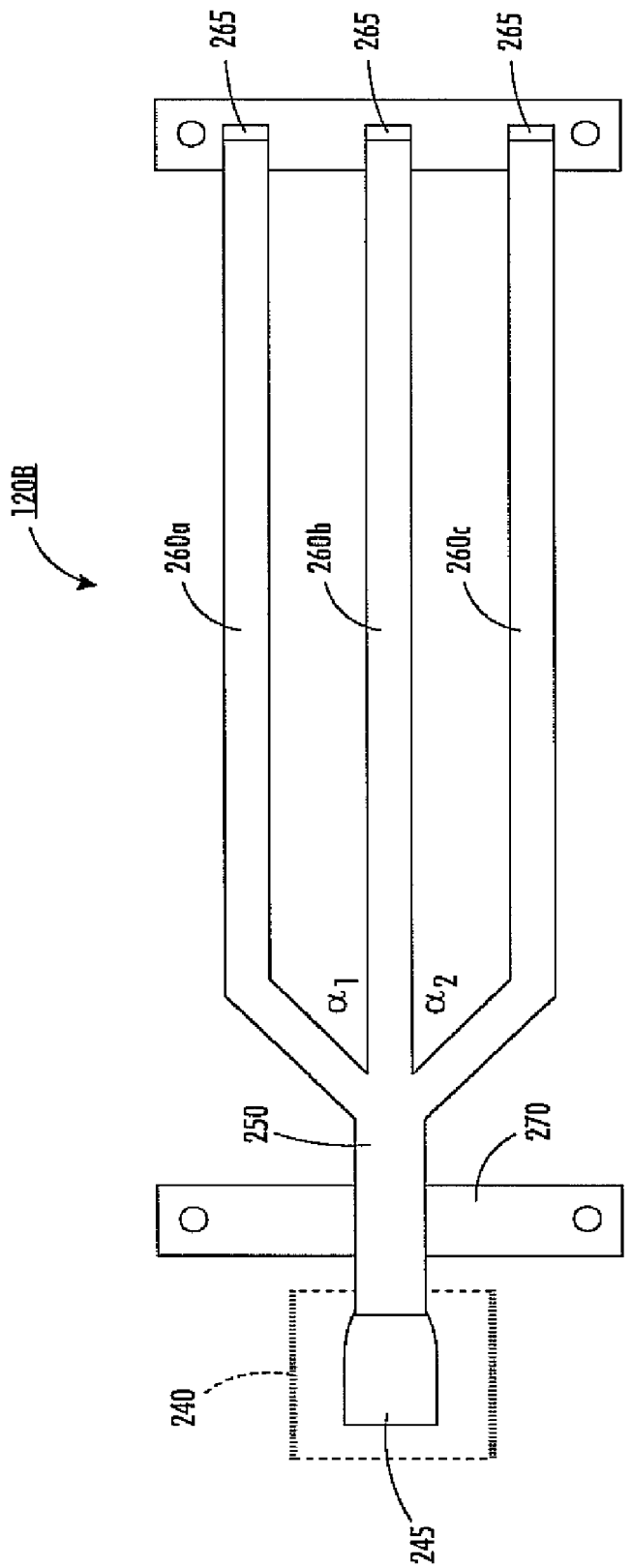

FIGS. 2A-2B depict various exemplary illuminators 120A-B useful for the scanner illuminating system of FIG. 1 in accordance with various embodiments of the present teachings.

The exemplary illuminators 120A-B can include a light source 240 coupled with a plurality of light guides 260 by a light splitter 250.

In embodiments, the light source 240 can include a plurality of LEDs 245 configured to generate light into the light splitter 250 as seen in FIG. 2A. Each of the plurality of LEDs 245 can have same or different illuminating powers. In embodiments, the light source 240 can include a single LED 245 as seen in FIG. 2B. The single LED for the illuminator 120B can have a high illuminating power.

In embodiments, the light source 240 that includes one or more LEDs as shown in FIGS. 2A-2B can have a total illuminating power of, for example, at least about 1000 lux, or ranging from about 1000 lux to about 30,000 lux, or exceeding about 30,000 lux, e.g., for high speed applications. In embodiments for low speed applications, the total illuminating power of the light source 240 can be about 1000 lux.

The light splitter 250 in FIGS. 2A-2B can split light generated by the light source 240 into each light guide of the plurality of light guides 260. In embodiments, the light splitter 250 can provide equal or balanced beam path lengths along each light guide 260. Note that although one light splitter 250 is shown in FIGS. 2A-2B, one of ordinary skill in the art would understand that one or more light splitters 250 can be used in each illuminator of FIGS. 2A-2B such that equal or balanced beam path lengths along each light guide can be obtained.

In embodiments, the light splitter 250 can provide necessary angular relationship (see angle $\alpha$, $\alpha_1$, $\alpha_2$ in FIGS. 2A-2B) between, for example, a first split beam (not shown) introduced into a first light guide 260a, a second split beam (not shown) introduced into a second light guide 260b, or a third split beam (not shown) introduced into a third light guide 260c, etc.

In the embodiment shown in FIG. 2A, through the light splitter 250, light ejected from the light source 240 can be directed into each light guide 260, for example, directed at a shallow angle of about 30 degrees or turned through about 90 degrees, and then coupled into the light guides, depending on the physical construction of the light splitter 250. In embodiments, the splitting angle $\alpha$ can range from 0 degree to about 90 degrees. The light splitter 250 can be a V-shaped light splitter or an L-shaped light splitter.

In the specific embodiment shown in FIG. 2B, the light splitter 250 can have splitting angles $\alpha_1$ and $\alpha_2$ in order to introduce light into three light guides 260a-c. The splitting angles $\alpha_1$ and $\alpha_2$ can be the same or different, for example, each ranging from 0 degree to about 90 degrees.

In embodiments, each light guide 260 as shown in FIGS. 2A-2B can have a length of, for example, about 200 mm or longer, or ranging from about 200 mm (e.g., for A4 applications) to about 350 mm (e.g., for A3 applications), although other lengths such as more than about 350 mm can also be included. In embodiments, the light guide 260 can have a length smaller than 200 mm, for example, when used for applications such as bank note scanning. In embodiments, each of the plurality of light guides 260 can be the same or different. In embodiments, the light guide 260 can be formed of a material including, for example, a plastic or a glass.

Figure 3:
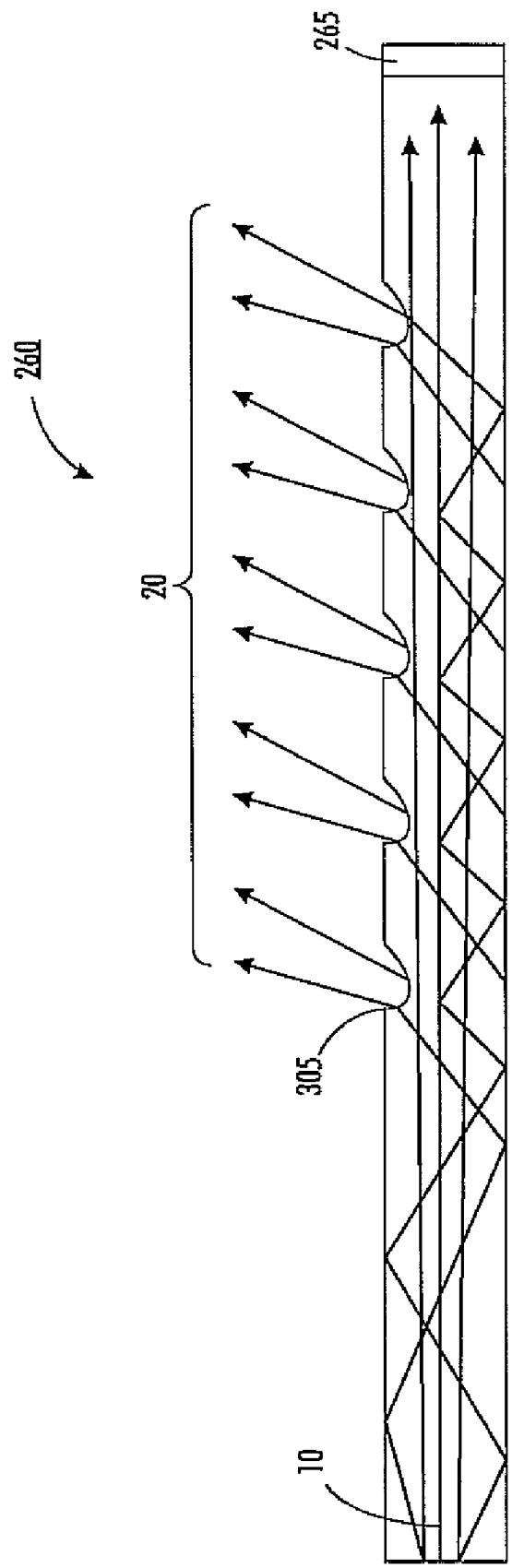
FIG. 3 depicts an exemplary light guide useful for the illuminators of FIGS. 2A-2B in accordance with various embodiments of the present teachings.

As disclosed, various light guides can be used for the illuminators of FIGS. 2A-2B. FIG. 3 depicts an exemplary light guide 260 in accordance with various embodiments of the present teachings.

For example, the light guide 260 in FIG. 3 can have a light-diverting surface structure or a grid formed by a plurality of lines 305 or other surface patterns for diverting the split beam 10 outside of the light guide 260.

In embodiments, the plurality of surface patterns can be engraved, for example, laser engraved, or etched into predetermined surface(s) of the light guide in FIG. 3. The plurality of surface patterns can cause a portion of the split beam 10 traveling in the light guide to be diverted to the outside region of the light guide. The diverted beam 20 outside of the light guide can then be, for example, focused, and can illuminate the document (see FIG. 1).

In an exemplary embodiment, the light-diverting surface structure can be configured to provide a substantially uniform distribution of the diverted beam 20 out of the light guide and onto the document. Further, the light-diverting surface structure can provide a uniform distribution of the diverted beam 20 at a desired lighting level using very narrow grid lines, for example.

In embodiments, the light guides can optionally have smooth specular reflecting interior surface. For example, a frosting or a reflective material 265 (see FIGS. 2A-2B and FIG. 3), such as polished aluminum, can be used to cover an interior surface of the light guides such that the introduced light beam can not escape out of the light guide, but can be reflected back into the light guide. That is, light can be internally reflected within each light guide and escape only through the diffused lines (see 305 in FIG. 3) providing a grid line illumination.

Referring back to FIGS. 2A-2B, the light source 240 can be, e.g., fixed to the light splitter 250, which can be mounted by a mounting assembly 270. The plurality of light guides 260 can also be mounted on an opposite side of the light splitter. The mounting assemblies 270 can include, for example, a mounting flange molded in a single plastic integral shape. The mounting assemblies 270 can provide an alignment geometric stability and a reduced alignment tolerance because the plurality of light guides 260 is molded together by the mounting assembly. The mounting and alignment issues occurred in the prior art can be eliminated.

In various embodiments, by using the disclosed illuminators 120, all ejected light from the light source 240 can be utilized. In embodiments, illumination balance on the narrow strip of the document can be obtained due to the coupling of the light source with the light splitter.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising."

Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A scanner illuminator comprising:
    a light source;
    a plurality of light guides, wherein each of the plurality of light guides has a length smaller than 200 mm for a bank note scanning; and
    one or more light splitters that couple the light source to each of the plurality of light guides such that light generated by the light source is introduced into each of the plurality of light guides through the one or more light splitters;
    wherein each light guide is configured to divert light introduced into the light guide outside of the light guide.

2. The illuminator of claim 1, wherein the light source comprises one or more light emitting diodes (LEDs), wherein the light source has an illuminating power of at least about 1000 lux.

3. The illuminator of claim 1, wherein each of the plurality of light guides has a length ranging from about 200 mm to about 350 mm.

4. The illuminator of claim 1, wherein a surface of each light guide has a plurality of surface patterns for diverting the introduced light outside of the light guide.

5. The illuminator of claim 4, wherein the plurality of surface patterns is laser engraved or etched into the surface of each light guide.

6. The illuminator of claim 1 further comprising a reflective material coated on an interior surface of each light guide.

7. The illuminator of claim 1 further comprising a mounting assembly configured to mount the one or more light splitters and the plurality of light guides.

8. The scanner illuminator of claim 1, wherein each of the one or more light splitters is configured to split the light into at least a first light beam and a second light beam and further configured to direct the first light beam into only a first light guide and to direct the second light beam into only a second light guide.

9. A scanner illuminating system comprising:
    a scanner illuminator comprising:
    a single light emitting diode (LED) configured to emit light into a light splitter; and
    two or more light guides coupled with the light splitter such that the light emitted from the single LED is introduced into each of the two or more light guides through the light splitter; wherein each light guide is configured to divert light introduced into light guide outside of the light guide, and the light splitter is configured to split light emitted by the single LED into at least a first light beam and a second light beam and to direct the first light beam into only a first light guide and to direct the second light beam into only a second light guide.

10. The system of claim 9, wherein the single LED has an illuminating power of at least about 1000 lux.

11. The system of claim 9, wherein the light splitter has a splitting angle ranging from 0° to about 90°.

12. The system of claim 9, wherein the light splitter comprises a V-shaped light splitter or an L-shaped light splitter.

13. The system of claim 9 further comprising a mounting assembly configured to mount the light splitter and the two or more light guides.

14. A scanner illuminating system comprising:
    a scanner illuminator comprising:
    one light source configured for emitting light, wherein the one light source comprises one or more light emitting diodes (LEDs);
    one or more light splitters configured to split the emitted light from the one or more LEDs into each of a plurality of light guides; wherein each of the plurality of light guides has a length of less than about 200 mm for a bank note scanner and each light guide is configured to divert the light split in the light guide outside of the light guide to illuminate a document; and
    a lens adapted to receive an imaging light reflected from the illuminated document and to focus the reflected imaging light onto a sensor element, wherein the sensor element generates an electronic signal corresponding to the reflected imaging light.

15. The system of claim 14, wherein the one or more LEDs have a total illuminating power of at least about 1000 lux.

16. The system of claim 14, wherein each of the plurality of light guides has a length ranging from about 200 mm to about 350 mm.

17. The system of claim 14, wherein each of the one or more light splitters comprises a V-shaped light splitter or an L-shaped light splitter.

18. The system of claim 14, wherein a surface of each of the plurality of light guides has a plurality of surface patterns that is laser engraved or etched into the surface.

19. The system of claim 14, wherein the sensor element comprises a charge coupled device (CCD), a full width array (FWA), a contact image sensor (CIS), or a complementary metal oxide semiconductor (CMOS).

* * * * *